(12) United States Patent
Zhao et al.

(10) Patent No.: US 12,187,137 B2
(45) Date of Patent: Jan. 7, 2025

(54) BATTERY PACK CONTROL METHOD AND SYSTEM, AND VEHICLE

(71) Applicant: Great Wall Motor Company Limited, Baoding (CN)

(72) Inventors: Qing Zhao, Baoding (CN); Shujiang Chen, Baoding (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 288 days.

(21) Appl. No.: 17/754,359

(22) PCT Filed: Nov. 23, 2020

(86) PCT No.: PCT/CN2020/130888
§ 371 (c)(1),
(2) Date: Mar. 30, 2022

(87) PCT Pub. No.: WO2021/104204
PCT Pub. Date: Jun. 3, 2021

(65) Prior Publication Data
US 2022/0340012 A1  Oct. 27, 2022

(30) Foreign Application Priority Data
Nov. 28, 2019  (CN) .......................... 201911194054.5

(51) Int. Cl.
*B60L 3/04* (2006.01)
*B60L 3/00* (2019.01)
(Continued)

(52) U.S. Cl.
CPC ............... *B60L 3/04* (2013.01); *B60L 3/0046* (2013.01); *B60L 58/12* (2019.02); *B60L 58/26* (2019.02);
(Continued)

(58) Field of Classification Search
None
See application file for complete search history.

(56) References Cited

U.S. PATENT DOCUMENTS

| 2008/0202741 | A1* | 8/2008 | Lee | B60H 1/00278 |
| | | | | 165/104.33 |
| 2014/0338376 | A1 | 11/2014 | Carpenter et al. | |
| 2018/0141458 | A1* | 5/2018 | Jammoul | H01M 10/63 |

FOREIGN PATENT DOCUMENTS

| CN | 104149600 | 11/2014 |
| CN | 204210324 | 3/2015 |

(Continued)

OTHER PUBLICATIONS

CNIPA, First Office Action for CN Application No. 201911194054.5, Jul. 14, 2021.
(Continued)

*Primary Examiner* — Hongye Liang
(74) *Attorney, Agent, or Firm* — Hodgson Russ LLP

(57) ABSTRACT

The present disclosure provides a battery pack control method, a system and a vehicle, wherein the vehicle includes a battery sensor, a heating module and a cooling module; when the vehicle is in a powered-off state, a battery sensor is firstly used to detect the current battery temperature value of the battery pack and the current state of the thermostatic control function of the battery pack; and when the current temperature value of the battery pack is out of a preset range and the thermostatic control function of the battery pack opens, the vehicle is waken up, and then the battery pack is thermostatic controlled, so that the temperature of the battery pack is maintained within the preset range, which facilitates the restarting and use of the vehicle.

11 Claims, 6 Drawing Sheets

(51) Int. Cl.
    *B60L 58/12*           (2019.01)
    *B60L 58/26*           (2019.01)
    *B60L 58/27*           (2019.01)

(52) U.S. Cl.
    CPC ......... *B60L 58/27* (2019.02); *B60L 2240/545* (2013.01)

(56) References Cited

FOREIGN PATENT DOCUMENTS

| | | | |
|---|---|---|---|
| CN | 105235472 | | 1/2016 |
| CN | 105922880 | | 9/2016 |
| CN | 106921003 | | 7/2017 |
| CN | 107672465 | | 2/2018 |
| CN | 107672466 | | 2/2018 |
| CN | 109244568 | * | 8/2018 |
| CN | 109273793 | | 1/2019 |
| CN | 109532562 | | 3/2019 |
| JP | 2018103841 | | 7/2018 |
| KR | 20190026485 | | 3/2019 |

OTHER PUBLICATIONS

CNIPA, Second Office Action for CN Application No. 201911194054.5, Nov. 9, 2021.
WIPO, International Search Report for PCT/CN2020/130888, Feb. 23, 2021.
EPO, Communication for EP Application No. 20894318.3, Aug. 4, 2022.

* cited by examiner

BATTERY PACK CONTROL METHOD AND SYSTEM, AND VEHICLE

CROSS-REFERENCE TO RELATED APPLICATIONS

The present disclosure is a U.S. national stage entry of International Application No. PCT/CN2020/130888, filed Nov. 23, 2020, which claims the priority to Chinese Patent Application No. 201911194054.5, filed Nov. 28, 2019, the entire disclosures of which are incorporated herein by reference.

TECHNICAL FIELD

The present disclosure relates to the technical field of automobiles, and more particularly, relates to a battery pack control method, a system, and a vehicle.

BACKGROUND

At present, with the emerging of energy crisis and environmental pollution problems, new energy automobiles such as pure electric vehicles and hybrid electric vehicles etc. have been significant development direction of automobile industry due to their outstanding advantages in energy saving and environmental protection.

Battery packs used as a power source in new energy automobiles can only achieve maximum performance within a suitable temperature range. That a temperature of the battery is too high or too low may cause damage to the battery pack and may even cause a safety accident. However, in order to prevent the temperature of the battery pack from being too low or too high, a heat management system is used in the existing hybrid electric vehicles and pure electric vehicles to control the temperature of the battery pack.

However, the existing heat management system requires the vehicle to be operated in a powered-on state, and after the vehicle is in a powered-off state, the existing heat management system cannot be used to control the temperature of the battery pack, and there is a problem that the temperature of the power battery pack exceeds a suitable temperature range due to the lower or higher ambient temperature, and the vehicle cannot be convenient to be started and used again.

SUMMARY

In view of the above, the present disclosure aims to provide a battery pack control method, a system, and a vehicle to solve the problems in the prior art that after the vehicle is powered-off, the temperature of a battery pack cannot be controlled using a heat management system, and the temperature of the battery pack is likely to be too low or too high due to a lower or a higher ambient temperature.

In order to achieve the above objective, the technical solutions of the present disclosure are achieved as follows:

a battery pack control method, which is applied to a vehicle, wherein the vehicle includes a battery sensor, a heating module, and a cooling module, the method includes:

acquiring a current battery temperature value of a battery pack of the vehicle and a current state of a thermostatic control function of the battery pack via the battery sensor when the vehicle is in a powered-off state;

switching the vehicle from a powered-off state to a powered-on state when the current battery temperature value is not within a preset range and the current state of the thermostatic control function is ON-state;

performing a heating process on the battery pack if the heating module satisfies a first preset condition so that the temperature of the battery pack returns to be within the preset range, when the vehicle is in the powered-on state and the current battery temperature value is less than the preset lower limit value, wherein preset lower limit value is the minimum value within the preset range; and performing a cooling process on the battery pack if the cooling module satisfies a second preset condition so that the temperature of the battery pack returns to be within the preset range, when the vehicle is in the powered-on state and the current battery temperature value is greater than the preset upper limit value, wherein preset upper limit value is the maximum value within the preset range.

Further, according to the method, the first preset condition includes that the heating module is enabled, and after the vehicle is in the powered-off state a number of times the heating module is enabled is less than a first number threshold value;

the second preset condition includes that the cooling module is enabled, and after the vehicle is in the powered-off state, a number of times the cooling module is enabled is less than a second number threshold value.

Further, according to the method, before the step that performing the heating process on the battery pack if the heating module satisfies the first preset condition, so that the temperature of the battery pack returns to be within the preset range, when the vehicle is in the powered-on state and the current temperature value is less than the preset lower limit value, the method further includes:

acquiring a current ambient temperature value when the vehicle is in the powered-on state; and the first preset condition further includes that the current ambient temperature value is less than a preset temperature threshold value.

Further, the method further includes:

controlling the battery sensor to enter a sleep state if the heating module does not satisfy the first preset condition, or the cooling module does not satisfy the second preset condition, or the current state of the thermostatic control function of the battery pack is a cut-off state.

Further, the method further includes:

controlling the battery sensor to enter a sleep state, if a number of times a first case occurs is greater than or equal to a third number threshold value;

wherein the first case is a case where the current battery temperature value is less than the preset lower limit value and the current ambient temperature value is not less than the preset temperature threshold value.

Further, according to the method, the first preset condition further includes that a state of charge value of the battery pack is less than a preset charge threshold value, the heating module is an engine of the vehicle, the engine is capable of being started, and the engine is used for performing a heating process on the battery pack;

the heating process includes:

starting the engine and heating the battery pack by the engine.

Further, according to the method, the first preset condition further includes that when the state of charge value of the battery pack is greater than or equal to a preset charge threshold value, the heating module is a heating element;
the heating process includes:
utilizing the battery pack to supply power for a heating element and heating the battery pack by the heating element.

Further, according to the method, the second preset condition further includes that when the state of charge value of the battery pack is greater than or equal to a preset charge threshold value, the cooling module includes a compressor;
the cooling process includes:
utilizing the battery pack to supply power for the compressor and cooling the battery pack by the compressor;
the second preset condition further includes that when the state of charge value of the battery pack is less than the preset charge threshold value, the cooling module includes a cooling water circulation structure in the battery pack or a radiator of the vehicle;
when the cooling module includes a cooling water circulation structure in the battery pack, the cooling process includes:
cooling the battery pack by the cooling water circulation structure in the battery pack;
when the cooling module includes a radiator of the vehicle, the cooling includes:
utilizing the radiator to cool the battery pack.

Another objective of the present disclosure is to provide a battery pack control system applied to a vehicle, the vehicle includes a battery sensor, a heating module, and a cooling module, wherein the system includes:
a battery pack state acquisition processor configured to acquire a current battery temperature value of a battery pack of the vehicle and a current state of a thermostatic control function of the battery pack via the battery sensor when the vehicle is in a powered-off state;
a wake-up processor configured to switch the vehicle from a powered-off state to a powered-on state when the current battery temperature value is not within a preset range and the current state of the thermostatic control function is ON-state;
a first control processor configured to perform a heating process on the battery pack by the heating module if the heating module satisfies a first preset condition so that the temperature of the battery pack returns to be within the preset range, when the vehicle is in the powered-on state and the current battery temperature value is less than the preset lower limit value, wherein preset lower limit value is the minimum value within the preset range; and
a second control processor configured to perform a cooling process on the battery pack by the cooling module if the cooling module satisfies a second preset condition so that the temperature of the battery pack returns to be within the preset range, when the vehicle is in the powered-on state and the current battery temperature value is greater than the preset upper limit value, wherein preset upper limit value is the maximum value within the preset range.

Further, according to the system, the first preset condition includes that the heating module is enabled, and after the vehicle is in the powered-off state, a number of times the heating module is enabled is less than a first number threshold value; and
the second preset condition includes that the cooling module is enabled, and after the vehicle is in the powered-off state, a number of times the cooling module is enabled is less than a second number threshold value.

Further, the system further includes: an ambient temperature acquisition module configured to acquire a current ambient temperature value when the vehicle is in the powered-on state;
the first preset condition further includes that the current ambient temperature value is less than a preset temperature threshold value.

Further, the system further includes:
a third control processor configured to control the battery sensor to enter a sleep state if the heating module does not satisfy the first preset condition, or the cooling module does not satisfy the second preset condition, or the current state of the thermostatic control function of the battery pack is a cut-off state.

Further, the system further includes:
a fourth control processor configured to control the battery sensor to enter a sleep state, if a number of times a first case occurs is greater than or equal to a third number threshold value;
wherein the first case is a case when the current battery temperature value is less than the preset lower limit value and the current ambient temperature value is not less than the preset temperature threshold value.

Further, according to the system, the first preset condition further includes that a state of charge value of the battery pack is less than a preset charge threshold value, the heating module is an engine of the vehicle, the engine is capable of being started be started, and the engine is used for performing a heating process on the battery pack;
the heating process includes:
starting the engine and heating the battery pack by the engine.

Further, according to the system, the first preset condition further includes that when the state of charge value of the battery pack is greater than or equal to a preset charge threshold value, the heating module is a heating element;
the heating process includes:
utilizing the battery pack to supply power for a heating element and heating the battery pack by the heating element.

Further, according to the system, the second preset condition further includes that when the state of charge value of the battery pack is greater than or equal to a preset charge threshold value, the cooling module includes a compressor;
the cooling process includes:
utilizing the battery pack to supply power for the compressor and cooling the battery pack by the compressor;
the second preset condition further includes that when the state of charge value of the battery pack is less than the preset charge threshold value, the cooling module includes a cooling water circulation structure in the battery pack or a radiator of the vehicle;
when the cooling module includes the cooling water circulation structure in the battery pack, the cooling process includes:
cooling the battery pack by the cooling water circulation structure in the battery pack;
when the cooling module includes a radiator of the vehicle, the cooling includes:
utilizing the radiator to cool the battery pack.

The battery pack control method and system of the present disclosure have the following advantages over the prior art:

when the vehicle is in a powered-off state, firstly, a battery sensor is used to acquire a current temperature value of a battery pack of the vehicle and a current state of a thermostatic control function of the battery pack, and in the case where the current battery temperature value is not within a preset range and the current state of the thermostatic control function is ON-state, the vehicle is switched from the powered-off state to the powered-on state; then in the case where the current battery temperature value is less than a preset lower limit value, if the heating module satisfies a first preset condition, the battery pack is heated via the heating module so as to enable the temperature of the battery pack to return to a preset range; or in the case where the current battery temperature value is greater than the preset upper limit value, if the cooling module satisfies the second preset condition, the battery pack is cooled by the cooling module so that the temperature of the battery pack returns to be within the preset range. That is, in the present disclosure, when the vehicle is in a powered-off state, a battery sensor is firstly used to detect the current battery temperature value of the battery pack and the current state of the thermostatic control function of the battery pack; and when the current temperature value of the battery pack is out of a preset range and the thermostatic control function of the battery pack is enabled, the vehicle is waken up, and then the battery pack is thermostatic controlled, so that the temperature of the battery pack is maintained within the preset range, which facilitates the restarting and use of the vehicle.

There is still another objective of the present disclosure to provide a vehicle, wherein the vehicle includes the battery pack control system.

The advantages of the vehicle are the same as the above battery pack control method and system with respect to the prior art, and which will not be repeated here.

The foregoing description is only an overview of the technical solutions of the present disclosure, and the embodiments of the present disclosure are described below in order that the technical means of the present disclosure may be clearly understood, and the foregoing and other objects, features, and advantages of the present disclosure may be more clearly understood.

BRIEF DESCRIPTION OF THE DRAWINGS

In order to clearly illustrate the embodiments or technical solutions of the present disclosure, the drawings used in the embodiments or technical solutions of the present disclosure will be briefly described below, and it is obvious that the drawings in the following description are some embodiments of the present disclosure, and other drawings can be obtained by those skilled in the art without creative efforts.

The accompanying drawings, which are included to provide a further understanding of the present disclosure, illustrate embodiments of the present disclosure and together with the description serve to explain the present disclosure and are not to be construed as limiting the present disclosure. In the drawings.

DETAILED DESCRIPTION OF THE EMBODIMENTS

Figure 1:
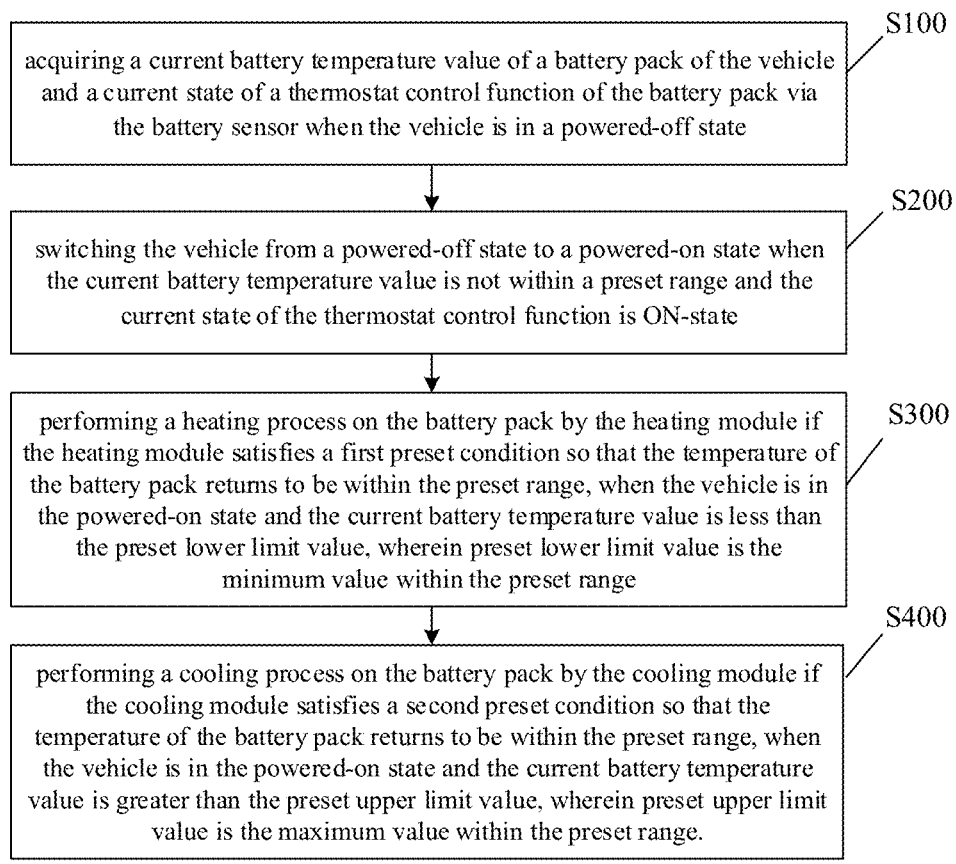
FIG. 1 is a schematic flow diagram of a battery pack control method according to an embodiment of the present disclosure.

To make the objectives, technical solutions and advantages of the embodiments of the present disclosure more apparent, the technical solutions in the embodiments of the present disclosure will be described clearly and completely combined with the drawings in the embodiments of the present disclosure, and it is obvious that the described embodiments are some, but not all embodiments of the present disclosure. All other embodiments, which can be derived by a person skilled in the art from the embodiments disclosed herein without inventive step, are intended to be within the scope of the present disclosure.

Embodiments of the present disclosure will be described in more detail below with reference to the accompanying drawings. While embodiments of the present disclosure are illustrated in the drawings, it should be understood that the present disclosure may be embodied in various forms and should not be limited to the embodiments set forth herein. Rather, these embodiments are provided so that this present disclosure will be thorough and complete, and will fully convey the scope of the present disclosure to those skilled in the art.

It should be noted that, in the present disclosure, the embodiments and the features of the embodiments may be combined with each other without conflict.

The present disclosure will be described in detail below with reference to the accompanying drawings in conjunction with embodiments.

Referring to FIG. 1, there is shown a schematic flow diagram of a battery pack control method according to an embodiment of the present disclosure, which is applied to a vehicle the vehicle includes a battery sensor, a heating module and a cooling module, the method included steps S100-S400:

Step S100, acquiring a current battery temperature value of a battery pack of the vehicle and a current state of a thermostatic control function of the battery pack via the battery sensor when the vehicle is in a powered-off state.

In step S100, the powered-off state refers to a state after the power supply of the vehicle is cut off, that is, a state in which the entire vehicle is asleep, and electric control devices of the vehicle are all asleep. The battery sensor is connected to the battery pack of the vehicle and uses the battery pack as a power source, and can detect state information about the battery pack, wherein the state information can include the current battery temperature value of the battery pack and the current state of a thermostatic control function of the battery pack, and therefore the battery sensor can activate and detect the state information only when the battery pack has a current.

Wherein the thermostatic control function of the battery pack refers to a function of controlling the temperature value of the battery pack within a preset range, and the thermostatic control function includes ON-state and a cut-off state. If the current state of the thermostatic control function of the battery pack is a cut-off state, it is indicated that the temperature control over the battery pack is not allowed; if the current state of the thermostatic control function of the battery is ON-state, the temperature control over the battery pack is allowed.

Specifically, the thermostatic control function of the battery pack includes a battery pack heat preservation control sub-function and a battery pack cooling preservation control sub-function. Wherein, the battery pack heat preservation control sub-function is executed by the heating module, and the battery pack cooling preservation control sub-function is executed by the cooling module. The battery pack heat preservation control sub-function opens, that is, controlling the heating module to be enabled; controlling the battery pack cooling preservation control sub-function refers to controlling the cooling module to be enabled.

In practical application, the opening or closing of the thermostatic control function of the battery pack can be selected via a preset interface, which can be displayed on a display screen of the vehicle central control or on a mobile terminal communicatively connected to the vehicle central control. The thermostatic control function is closed by default, and when the thermostatic control function is selected to be closed, all the setting items related to the thermostatic control function are gray, and the setting operation cannot be carried out.

In practical application, the battery sensor may be a battery management system, which may not be controlled by a vehicle power supply, i.e., the battery management system may remain in an operating state when the vehicle is in the powered-off state, or may enter the sleep state when the vehicle power supply is cut off, and then periodically start and detect status information of the battery pack.

Step S200, switching the vehicle from a powered-off state to a powered-on state when the current battery temperature value is not within a preset range and the current state of the thermostatic control function is ON-state.

In the above-mentioned step S200, the preset range is a preset preferred operating temperature range of the battery pack, and when the current temperature value of the battery pack is within the preset range, the performance of the battery pack is better, and the battery pack can be normally started and used. When the current battery temperature value is not within the preset range, it is indicated that the battery pack is currently overheated or undercooled, and at this time, in order to ensure the normal use of the battery pack, it is theoretically necessary to carry out corresponding temperature control over the battery pack.

However, whether the temperature control of the battery pack is specifically executed requires to determine the current state of the above the thermostatic control function. If the current state of the thermostatic control function is the opening state, it is indicated that not only the corresponding temperature control over the battery pack is theoretically required, but also the temperature control over the battery pack is allowed. Thus, the vehicle is switched from the powered-off state to the powered-on state, i.e., the vehicle is awakened, so that the battery pack is thermostatically controlled.

However, if the current state of the thermostatic control function is the cut-off state, it is described that although it is theoretically necessary to control the temperature of the battery pack accordingly, the temperature control over the battery pack is not allowed, and thus the operation of switching the vehicle from the powered-off state to the powered-on state is not carried out, that is, the vehicle is not awakened, and the thermostatic control over the battery pack is not carried out.

In practical application, the vehicle is switched from a powered-off state to a powered-on state, which is specifically shown that a battery sensor is used to wake up a controller local area network bus of the vehicle so as to wake up a whole vehicle controller, and the above-mentioned current temperature value is sent to the whole vehicle controller via the controller local area network bus, and then the whole vehicle controller carries out thermostatic control over the battery pack according to the current temperature value.

Step S300, performing a heating process on the battery pack by the heating module if the heating module satisfies a first preset condition so that the temperature of the battery pack returns to be within the preset range, when the vehicle is in the powered-on state and the current battery temperature value is less than the preset lower limit value, wherein preset lower limit value is the minimum value within the preset range.

In the above step S300, the first preset condition is a precondition for allowing the battery pack to be heated by the heating module, which is a structure or a component on the vehicle that can heat the battery pack. The first preset condition is preset.

If the current battery temperature value is less than the preset lower limit value, it is indicated that the current temperature of the battery pack is too low, and at this time, if the heating module satisfies the first preset condition, it is indicated that the battery pack can be heated by the heating module, and accordingly the heating of the battery pack by the heating module is controlled so as to enable the battery pack to get out of a state where the temperature is too low, i.e., enabling the current temperature value of the battery pack to return to the above-mentioned preset range. Specifically, the preset lower limit value may be −30° C.

Step S400, performing a cooling process on the battery pack by the cooling module if the cooling module satisfies a second preset condition so that the temperature of the battery pack returns to be within the preset range, when the vehicle is in the powered-on state and the current battery temperature value is greater than the preset upper limit value, wherein preset upper limit value is the maximum value within the preset range.

In the above step S400, the second preset condition is a precondition for allowing the battery pack to be cooled by the heating module, which is a structure or a component on the vehicle that can cool the battery pack. The second preset condition is preset.

If the current battery temperature value is greater than the preset upper limit value, it is indicated that the current temperature of the battery pack is too high, and at this time, if a cooling module satisfies the second preset condition, it is indicated that the battery pack can be cooled by the cooling module, and accordingly the cooled of the battery pack by the cooling module is controlled so as to enable the battery pack to get out of a state where the temperature is too low, i.e., enabling the current temperature value of the battery pack to return to the above-mentioned preset range. Specifically, the preset lower limit value may be 55° C.

The battery pack control method according to an embodiment of the present disclosure has the following advantages over the prior art:

in the present disclosure, when the vehicle is in a powered-off state, firstly, a battery sensor is firstly used to detect the current battery temperature value of the battery pack and the current state of the thermostatic control function of the battery pack; and when the current temperature value of the battery pack is out of a preset range and the thermostatic control function of the battery pack opens, the vehicle is waken up, and then the battery pack is thermostatic controlled, so that the temperature of the battery pack is maintained within the preset range, which facilitates the restarting and use of the vehicle; thus, the problems in the prior art that after the vehicle is powered-off, the temperature of a battery pack cannot be controlled using a heat management system, and the temperature of the battery pack is likely to be too low or too high due to a lower or a higher ambient temperature can be solved.

In a preferred embodiment provided by the present disclosure, the above-mentioned battery pack control method includes steps S201 to S210:

step S201, acquiring a current battery temperature value of a battery pack of the vehicle and a current state of a thermostatic control function of the battery pack via the battery sensor when the vehicle is in a powered-off state.

The above-mentioned step S201 can be described in detail with reference to step S100, and will not be described again here.

Step S202, switching the vehicle from a powered-off state to a powered-on state when the current battery temperature value is not within a preset range and the current state of the thermostatic control function is ON-state.

The above-mentioned step S202 can be described in detail with reference to step S200, and will not be described again here.

Step S203, performing a heating process on the battery pack by the heating module if the heating module satisfies a first preset condition so that the temperature of the battery pack returns to be within the preset range, when the vehicle is in the powered-on state and the current battery temperature value is less than the preset lower limit value, wherein preset lower limit value is the minimum value within the preset range; the first preset condition includes that the heating module is enabled, and after the vehicle is in a powered-off state, the number of times the heating module is enabled is less than a first number threshold value.

In the above-mentioned step S203, i.e., when the vehicle is in the powered-on state, in a case where the current battery temperature value is less than the preset lower limit value, the heating module still needs to be enabled, and after the vehicle stops and enters the powered-off state until the current number of times of starting is less than the first number threshold value, the operation preforming performing a heating process on the battery pack by the heating module may be executed, so as to return the temperature of the battery pack to within the preset range. That is, when any one of the conditions that the heating module is enabled and the number of times of starting of the heating module after the vehicle stops and enters the powered-off state until the current is less than the first threshold value is not satisfied, the heating module will not heat the battery pack by the heating module.

Wherein setting the above-mentioned first preset condition includes enabling the heating module, i.e., setting to allow the heating module to heat the battery pack when the battery pack temperature is too low. This condition can prevent the heating module from self-starting and heating the battery pack when the temperature of the battery pack is less than the preset lower limit value, when the driver intends to stop starting the battery pack for a long time or the like, i.e., without heating and heat preservation of the battery pack.

In practical application, controlling the opening or closing of the heating module described above can be selected through a preset interface, which can present the options of opening or closing the heating module. The preset interface can be displayed on a display screen of the vehicle central control or on a mobile terminal communicatively connected to the vehicle central control. In the preset interface, when the heating module is dis-enabled by default, and the heating module is set to be dis-enabled, the set-up items related to the heat preservation control function of the battery pack are all grey, and the set-up operation cannot be carried out.

Wherein the setting of the first preset condition includes that after the vehicle is in the powered-off state, the number of times of enabling the heating module is less than the first threshold value, because if the number of times of enabling the heating module reaches the first threshold value after the vehicle is in the powered-off state, it is indicated that the driver does not use the vehicle for a long time, and the temperature of the battery pack is in a state of being less than a preset lower limit value due to ambient temperature is too low, so that the heating module is frequently enabled so as to maintain the temperature of the battery pack within a predetermined range. However, since the vehicle is not restarted for a while, that is, the battery pack is not started for a while, it is meaningless that the battery pack is subjected to the heating process, and the power of the battery pack is exhausted instead.

In practical application, the above-mentioned first number threshold value can be set via a preset interface, and the preset interface can present a setting option of the first number threshold value. The preset interface can be displayed on a display screen of the vehicle central control or on a mobile terminal communicatively connected to the vehicle central control. For example, the first number threshold value may be set to 3, and the maximum number of settings of the first number threshold value may be 20.

Optionally, the step S203 includes steps S301 to S302:

step S301, performing a heating process on the battery pack by the heating module if the heating module satisfies a first preset condition so that the temperature of the battery pack returns to be within the preset range, when the vehicle is in the powered-on state and the current battery temperature value is less than the preset lower limit value, wherein preset lower limit value is the minimum value within the preset range;

the first preset condition includes that the heating module is enabled, and after the vehicle is in the powered-off state, the number of times of enabling the heating module is less than a first number threshold value, the state of charge value of the battery pack is less than a preset charge threshold value, the heating module is an engine of the vehicle, the engine can be started, and the engine is used for heating the battery pack;

the heating includes:

starting the engine and heating the battery pack by the engine.

In the above-mentioned step S301, the preset charge threshold value is preset, and the preset charge threshold value is a preset lower limit value of the electricity for ensuring that the battery pack can start the vehicle. When the state of charge value of the battery pack is greater than or equal to the preset charge threshold value, there is sufficient charge of the battery pack for restarting the vehicle; and when the state of charge value of the battery pack is less than the preset charge threshold value, the amount of electricity of the battery pack is insufficient. The specific magnitude of the preset charge threshold value needs to be determined according to the capacity of the battery pack.

In the above-mentioned step S301, when the temperature of the battery pack is too low and the battery pack itself has insufficient power, if the vehicle has an engine and the engine is set in advance to allow starting, and the number of times the engine is started is less than the first threshold value after the vehicle is powered-off, the battery pack may be heated by starting the engine and by a cooling circuit structure of the engine, so that the current temperature value of the battery pack returns to the preset range. It can be seen that the execution of step S301 needs to satisfy that the vehicle is a hybrid vehicle.

In practical application, setting whether the engine is allowed to start and heat the battery pack may be selected through a preset interface that may show the options whether the engine is allowed to start and not heat the battery pack. The pre-interface is displayed on a display screen of the vehicle central control or on a mobile terminal communicatively connected to the vehicle central control. In the preset interface, when the engine set by default is not allowed to be started and the engine is set not allowed to be started, the setting items related to the engine start are all gray, and the setting operation cannot be carried out.

Step S302, performing a heating process on the battery pack by the heating module if the heating module satisfies a first preset condition so that the temperature of the battery pack returns to be within the preset range, when the vehicle is in the powered-on state and the current battery temperature value is less than the preset lower limit value, wherein preset lower limit value is the minimum value within the preset range;

the first preset condition includes that the heating module is enabled, and after the vehicle is in a powered-off state, the number of times the heating module is enabled is less than a first number threshold value, and the first preset condition further includes that when the state of charge value of the battery pack is greater than or equal to a preset charge threshold value, the heating module is a heating element;

the heating includes:

utilizing the battery pack to supply power for a heating element and heating the battery pack by the heating element.

In step S302, when the state of charge value of the battery pack is greater than or equal to the preset state-of-charge threshold value, the battery pack has a sufficient amount of power for the vehicle to be started again, and therefore if the number of times of starting the heat generating element is less than the first threshold value after the vehicle is in the powered-off state, the power of the battery pack itself can be used to supply power to the heat generating element as the heating module so as to heat the battery pack via the heat generating element, so that the current temperature value of the battery pack returns to be within the preset range.

Step S204, performing a cooling process on the battery pack by the cooling module if the cooling module satisfies a second preset condition so that the temperature of the battery pack returns to be within the preset range, when the vehicle is in the powered-on state and the current battery temperature value is greater than the preset upper limit value, wherein preset upper limit value is the maximum value within the preset range; the second preset condition includes that the cooling module is enabled, and after the vehicle is in a powered-off state, the number of times the cooling module is enabled is less than a second number threshold value.

In the above-mentioned step S204, i.e., when the current battery temperature value is greater than the preset upper limit value when the vehicle is in the powered-on state, the cooling module still needs to be enabled, and after the vehicle stops and enters the powered-off state until the current number of times of starting is less than the second number threshold value, the operation preforming performing a cooling process on the battery pack by the cooling module may be executed so as to return the temperature of the battery pack to within the preset range. That is, when any one of the conditions that the cooling module is enabled and the number of times of starting the cooling module after the vehicle stops and enters into the powered-off state until the current is less than the second threshold value is not satisfied, the operation preforming performing a cooling process on the battery pack by the cooling module may not be executed.

Wherein setting the above-mentioned second preset condition includes enabling the cooling module, i.e., setting to allow the cooling module to cool the battery pack when the battery pack temperature is too high. This condition can prevent the cooling module from self-starting and cooling the battery pack when the temperature of the battery pack is greater than the preset upper limit value when the driver intends to stop starting the battery pack for a long time or the like, i.e., avoid meaningless cooling of the battery pack.

In practical application, the opening or closing of the above-mentioned cooling module may be controlled via a preset interface, and the preset interface may exhibit an option of setting the cooling module to be enabled or dis-enabled. The preset interface can be displayed on a display screen of the vehicle central control or on a mobile terminal communicatively connected to the vehicle central control. The cooling module is dis-enabled by default, and when the cooling module is selected to be dis-enabled, the setting items related to the cooling preservation control function of the battery pack are all gray, and the setting operation cannot be carried out.

Wherein the setting of the above-mentioned second preset condition includes that after the vehicle is in the powered-off state, the number of times of enabling the heating module is less than the second number threshold value, because if the number of times of enabling the heating module reaches the second number threshold value after the vehicle is in the powered-off state, it is indicated that the driver does not use the vehicle for a long time, because the vehicle does not start again temporarily, that is, the battery pack does not start again, and at this time, it is meaningless to heat the battery pack, and instead the electricity of the battery pack is exhausted.

In practical application, the above-mentioned second number threshold value can be set via a preset interface, and the preset interface can present a setting option of the second number threshold value. The preset interface can be displayed on a display screen of the vehicle central control or on a mobile terminal communicatively connected to the vehicle central control. For example, the second number threshold value may be set to 3, and the maximum number of settings of the second number threshold value may be 20.

Optionally, the step S203 includes steps S401 to S402:

step S401, performing a cooling process on the battery pack by the cooling module if the cooling module satisfies a second preset condition so that the temperature of the battery pack returns to be within the preset range, when the vehicle is in the powered-on state and the current battery temperature value is greater than the preset upper limit value, wherein preset upper limit value is the maximum value within the preset range.

the second preset condition includes that the cooling module is enabled, and after the vehicle is in the powered-off state, the number of times the cooling module is enabled is less than a second number threshold value; and when the state of charge value of the battery pack is greater than or equal to a preset charge threshold value, the cooling module includes a compressor;

the cooling includes:

utilizing the battery pack to supply power for the compressor and cooling the battery pack by the compressor In step S401, when the temperature of the battery pack is too high and the battery pack itself has sufficient power, if the vehicle has a compressor, and after the vehicle is in a powered-off state, the number of times the compressor is started is less than the second number threshold value, the compressor can be driven by the electricity of the battery pack itself, and the temperature of the battery pack can be reduced by the compressor, so that the current temperature value of the battery pack returns to be within the preset range.

Step S402, performing a cooling process on the battery pack by the cooling module if the cooling module satisfies a second preset condition so that the temperature of the battery pack returns to be within the preset range, when the vehicle is in the powered-on state and the current battery temperature value is greater than the preset upper limit value, wherein preset upper limit value is the maximum value within the preset range.

the second preset condition includes that the cooling module is enabled, and after the vehicle is in the powered-off state, the number of times the cooling module is enabled is less than a second number threshold value; and when the state of charge value of the battery pack is less than the preset charge threshold value, the cooling module includes a cooling water circulation structure in the battery pack or a radiator of the vehicle;

when the cooling module includes a cooling water circulation structure in the battery pack, the cooling includes:

cooling the battery pack by a cooling water circulation structure in the battery pack;

when the cooling module includes a radiator of the vehicle, the cooling includes:

utilizing the radiator to cool the battery pack.

In step S402, when the temperature of the battery pack is too high and the power of the battery pack itself is insufficient, if the cooling module is allowed to cool the battery pack and after the vehicle is powered-off, if the number of times of cooling of the battery pack by the cooling module is less than the first number threshold value, the battery pack may be cooled down by the cooling water circulation structure in the battery pack or the radiator of the vehicle, so that the current temperature value of the battery pack returns to the preset range.

Step S205, after the vehicle is in the powered-off state, if the number of times of enabling the heating module reaches a first number threshold value, or if the number of times of enabling the cooling module reaches a second number threshold value, then the battery sensor is controlled to enter a hibernate state.

In the above-mentioned step S205, if the number of times of enabling the heating module reaches the first threshold value after the vehicle is in the powered-off state, it is indicated that the driver does not use the vehicle for a long time, and the temperature of the battery pack is in a state of being less than a preset lower limit value due to ambient temperature is too low, so that the heating module is frequently enabled so as to maintain the temperature of the battery pack within a predetermined range. However, since the vehicle is not restarted for a while, that is, the battery pack is not started for a while, it is meaningless that the battery pack is subjected to the heating process, and the power of the battery pack is exhausted instead. Therefore, in the case where the number of times of enabling the heating module reaches the first number threshold value, the battery sensor is controlled to enter a hibernate state, i.e., the current temperature of the battery pack is no longer monitored, and the current state of the thermostatic control function of the battery pack is no longer acquired, i.e., the vehicle is no longer awakened by the battery sensor, so as to save the electricity of the battery pack.

In the above step S205, if the number of times of enabling the cooling module reaches the second threshold value after the vehicle is powered-off, it is indicated that the driver does not use the vehicle for a long time, and the temperature of the battery pack is in a state greater than the preset upper limit value due to excessive ambient temperature, so that the cooling module is frequently enabled to maintain the temperature of the battery pack within the predetermined range. However, since the vehicle is not restarted for a while, that is, the battery pack is not started for a while, at this moment, it is meaningless that the battery pack is subjected to the heating process, and the power of the battery pack is exhausted instead. Therefore, in the case where the number of times of enabling the cooling module reaches the second number threshold value, the battery sensor is controlled to enter a hibernate state, i.e., the current temperature of the battery pack is no longer monitored, and the current state of the thermostatic control function of the battery pack is no longer acquired, i.e., the vehicle is no longer awakened by the battery sensor, so as to save the electricity of the battery pack.

Step S206, controlling the vehicle to switch from the powered-on state to the powered-off state when the current temperature value of the battery pack returns to the preset range.

In the above-mentioned step S206, when the temperature of the battery pack returns to the preset range, it is indicated that the current battery pack has gone out of the overheating or undercooling state, and there is no need to cool or heat the battery pack, and the corresponding cooling module and heating module are controlled to stop operating, and the vehicle is controlled to switch from the powered-on state to the powered-off state, i.e., the vehicle is controlled to enter the sleep state.

Specifically, the step S206 includes: controlling the heating module to stop operating and controlling the vehicle to switch from the powered-on state to the powered-off state when the current temperature value of the battery pack returns from being less than the preset lower limit value to being greater than or equal to a first target value, the first target value is within the above-mentioned predetermined range. Optionally, the first target value is −20° C.

Specifically, the step S206 includes: controlling the cooling module to stop operating and controlling the vehicle to switch from the powered-on state to the powered-off state when the current temperature value of the battery pack returns from being greater than the preset upper limit value to being less than or equal to a second target value, the second target value is within the above-mentioned predetermined range. Optionally, the second target value is 40° C.

Optionally, the method further includes:

Step S207, controlling the battery sensor to enter a sleep state if the heating module does not satisfy the first preset condition, or the cooling module does not satisfy the second preset condition, or the current state of the thermostatic control function of the battery pack is an cut-off state.

In the above-mentioned step S207, i.e., when any one or more of the heating module is dis-enabled, the number of times of enabling the heating module after the vehicle is in a powered-off state is greater than or equal to a first number threshold value, the cooling module is dis-enabled, and the number of times of enabling the cooling module after the vehicle is in a powered-off state is greater than or equal to a second number threshold value are satisfied, the control sensor enters into a hibernate state, i.e., the current temperature of the battery pack is no longer monitored by the battery sensor, and the current state of the thermostatic control function of the battery pack is no longer acquired by the battery sensor, i.e., the vehicle is no longer awakened by the battery sensor to save the power of the battery pack.

The battery pack control method according to an embodiment of the present disclosure has the following advantages over the prior art:

when the vehicle is in a powered-off state, firstly, a battery sensor is used to detect a current battery temperature value of the battery pack and a current state of the thermostatic control function of the battery pack, and the vehicle is waken up when the current temperature value of the battery pack exceeds the preset range and the thermostatic control function of the battery pack is enabled; and when the current battery temperature value is less than a preset lower limit value, the heating module is enabled, and after the vehicle is in a powered-off state, the number of times the heating module is enabled is less than the first number threshold value, the battery pack is heated by the heating module so that the temperature of the battery pack returns to be within a preset range; and when the current battery temperature value is greater than the preset upper limit value, the cooling module is enabled, and after the vehicle is in a powered-off state, the number of times the cooling module is enabled is less than the second number threshold value, the battery pack is cooled by the cooling module so that the temperature of the battery pack returns to the preset range. The embodiments of the present disclosure not only solve the problems in the prior art that the temperature of the battery pack cannot be controlled using a heat management system after the vehicle is in a powered-off state, and the temperature of the battery pack is easily too low or too high due to a low or high ambient temperature, but also avoid the case where the battery pack is thermostatically controlled by a heating module or a cooling module when the thermostatically controlled battery pack is not needed, thereby avoiding the waste of power of the battery pack.

Figure 2:
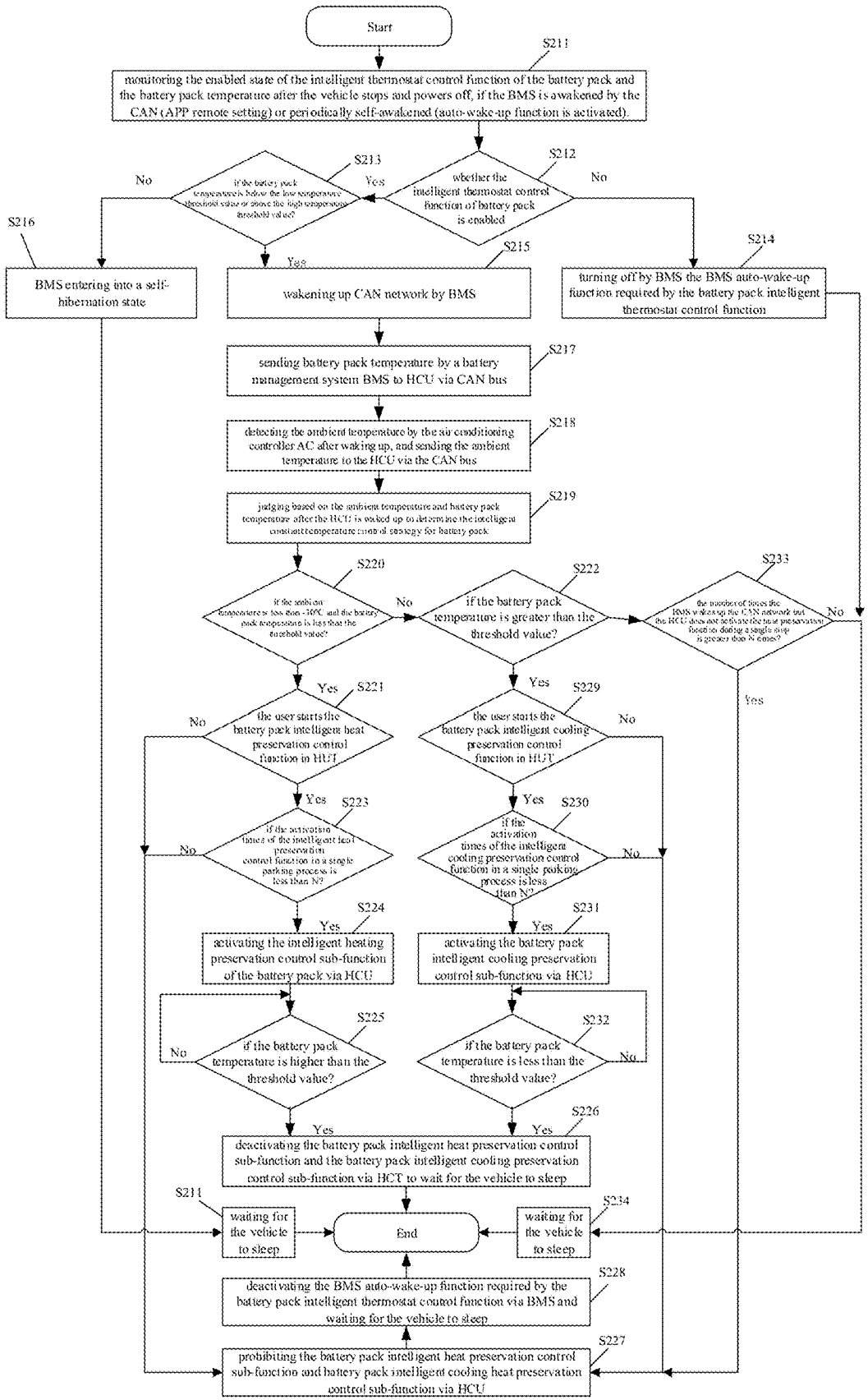
FIG. 2 is a flowchart illustrating the execution of a battery pack control method according to another embodiment of the present disclosure.

Referring to FIG. 2, in practical applications, a flowchart illustrating the execution of the battery pack control method according to an embodiment of the present disclosure, the execution process of the method includes steps S211 to S234.

As shown in FIG. 2, in step S211, after the vehicle stops and powers off, if the Battery Management System (BMS) is remotely set to wake up or periodically auto-wake-up by the Controller Area Network (CAN) via APP, the intelligent constant temperature control function of the battery pack and the battery pack temperature are detected, and then the process proceeds to step S212;

in step S212, it is determined whether the battery pack intelligent constant temperature control function is enabled, i.e., whether it is allowed to be used; if the battery pack intelligent constant temperature control function is enabled, the process proceeds to step S213; otherwise, the process proceeds to step S214 and controlling the BMS to close the auto-wake-up function, and the process proceeds to step S234 for controlling the vehicle to enter a sleep state;

in step S213, it is further determined whether the battery pack temperature is lower than a preset lower limit value or higher than a preset upper limit value, if the battery pack temperature is lower than the preset lower limit value or higher than the preset upper limit value, the process proceeds to step S215, otherwise the process proceeds to step S216 and the BMS is controlled to enter a self-hibernate state, and the process proceeds to step S234 for controlling the vehicle to enter a sleeping state;

in step S215, the BMS wakes up the CAN network, and then successively enters steps S217-S219;

in step S217, the BMS transmits the battery pack temperature detected in step S211 to a Hybrid Control Unit (HCU) via the CAN;

in step S218, an air-conditioning controller detects an ambient temperature after being waken up, and sends the ambient temperature to the HCU via the CAN;

in step S219, HCU judges based on the ambient temperature and the battery pack temperature, and determines an intelligent constant temperature control strategy for the battery pack;

in step S220, it is determined whether the ambient temperature is lower than −30° C. and the battery pack temperature is lower than a preset lower limit value, if the ambient temperature is lower than −30° C. and the battery pack temperature is lower than the preset lower limit value, the process proceeds to step S221, otherwise the process proceeds to step S222 to determine whether the battery pack temperature is higher than a preset upper limit value;

in step S221, it is detected whether the user has activated the battery pack intelligent heat preservation control function in the HUT, and if the user has activated the battery pack intelligent heat preservation control function in the HUT, the process proceeds to step S223 to further determine whether the number of times of activating the intelligent heat preservation control function during a single parking is less than the first number threshold value N; in step S221, if it is detected that the user does not start the intelligent battery pack heat preservation control function in the HUT, then the process proceeds to step S227;

in step S223, if it is determined that the number of times of activating the intelligent heat preservation control function during a single parking is less than N, then the process proceeds to step S224 to activate the intelligent heat preservation control sub-function of the battery pack via the HCU; in step S223, if it is determined that the number of times of activating the intelligent heat preservation control function during a single parking is not less than N, then the process proceeds to step S227;

in step S225, the battery pack temperature is continuously monitored so as to raise the battery pack temperature above a preset lower limit value via an intelligent battery pack heat preservation control function;

in step S226, after the battery pack temperature rises above the preset lower limit value, the HCU controls the battery pack intelligent heat preservation control function to be closed, and controls the vehicle to enter a sleep state;

in step S227, the battery pack intelligent heat preservation control sub-function and the battery pack intelligent cooling preservation control sub-function are prohibited by the HCU, and the process proceeds to step S228;

in step S228, the BMS is controlled to close the auto-wake-up function, and the process proceeds to step S234 where the control vehicle enters into a sleep state;

in step S222, if it is detected that the temperature of the battery pack is higher than the preset upper limit value, the process proceeds to step S229, detecting whether the user has activated the intelligent cooling preservation control function of the battery pack in the HUT; if it is detected that the battery pack temperature is not higher than the preset upper limit value, the process proceeds to step S233;

in step S229, if the user has activated the intelligent cooling preservation control function of the battery pack in the HUT, the process proceeds to step S230 to further determine whether the number of times of activating the intelligent cooling preservation control function during a single parking is less than a second number threshold value N; in step S229, if it is detected that the user does not activate the battery pack intelligent cooling preservation control function in the HUT, then the process proceeds to step S227;

in step S230, if it is determined that the number of times of activating the intelligent cooling preservation control function during a single parking is less than N, then the process proceeds to step S231, so as to activate the battery pack intelligent cooling preservation control sub-function via HCU; in step S230, if it is determined that the number of times of activating the intelligent cooling preservation control function during a single parking is not less than N, then the process proceeds to step S227;

in step S232, the battery pack temperature is continuously monitored so as to reduce the battery pack temperature to be lower than a preset upper limit value via an intelligent battery pack heat preservation control function;

in step S226, after the battery pack temperature falls below the preset upper limit value, the HCU controls the battery pack intelligent heat preservation control function to shut down, and controls the vehicle to enter a sleep state;

in step S233, it is detected whether the number of times the BMS wakes up the CAN network after the current parking and the HCU does not activate the heat preservation function is greater than a third number threshold value N; if YES, the process proceeds to step S227.

Figure 3:
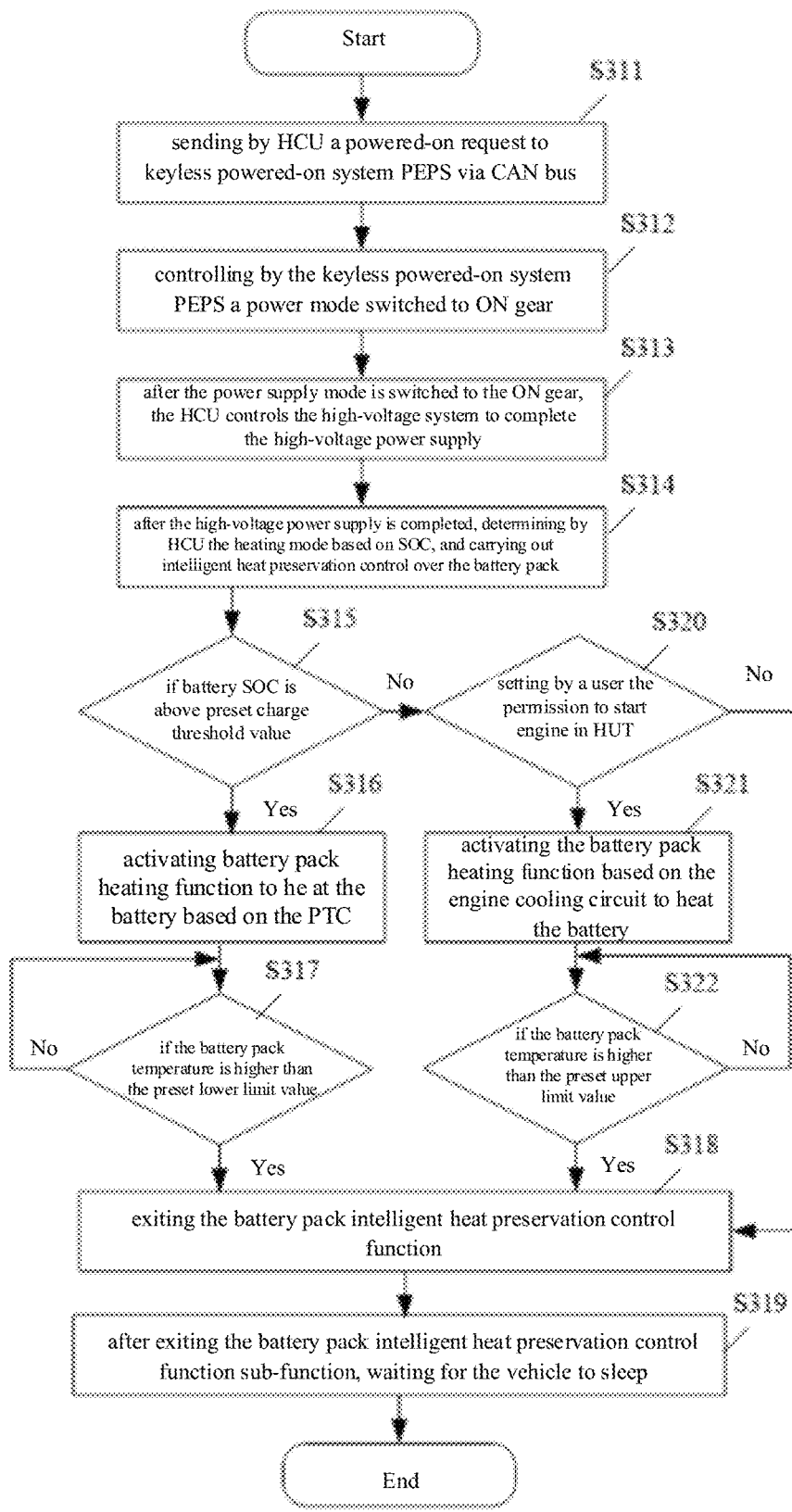
FIG. 3 is a flowchart for executing step S203 in another embodiment of the present disclosure.

Referring to FIG. 3, there is shown a flow chart of the execution of step S203 of an embodiment of the present disclosure in practical applications, including steps S311-S322, in practical application. As shown in FIG. 3, in step S311, when the vehicle is in a powered-on state, and the current battery temperature value is less than the preset lower limit value, the Hybrid Control Unit (HCU) first transmits a powered-on request to a keyless powered-on system through a Controller Area Network (CAN), and then in step S312, the keyless powered-on system controls the power mode of the vehicle to switch to ON gear. In step S313, after the power supply mode is switched to the ON gear, the hybrid controls the high-voltage system to complete the high-voltage power supply. In step S314, after the high-voltage system completes the high-voltage power supply, the hybrid control unit controls the heating module to execute heating the battery pack on the basis of the state of charge (SOC) value of the battery pack;

in step S315, it is determined whether the battery pack SOC is greater than a preset charge threshold value; when the state of charge value of the battery pack is greater than the preset charge threshold value, the process proceeds to step S316, a battery pack heating function is activated based on a positive temperature coefficient (PTC) to heat the battery pack, i.e., power is supplied to the positive temperature coefficient thermistor using the battery pack so as to use a heating element to heat the battery pack until the current temperature value of the battery pack is greater than or equal to a preset lower limit value; then the process proceeds to step S318, i.e., the positive temperature coefficient thermistor is controlled to stop working so as to realize controlling to exit the battery pack heat preservation function; then the process proceeds to step 319, i.e., after the battery pack heat preservation function is exited, the vehicle is controlled to enter a sleep state;

when the state of charge value of the battery pack is less than or equal to the preset charge threshold value, the process proceeds to step S320 where it is determined whether the user sets permission to start the engine in the HUT, that is, whether the engine can be started. If the engine can be started, then the process proceeds to step S321 to activate the battery pack heating function based on the engine cooling circuit to heat the battery pack, i.e., the engine is started and the cooling circuit structure of the engine is used to heat the battery pack until the current temperature value of the battery pack is greater than or equal to the preset lower limit value, and then the engine is controlled to stop operation so as to control the battery pack heat preservation function. After the battery pack heat preservation function is exited, the vehicle is controlled to enter a sleep state. However, if it is determined that the engine cannot be started, the process proceeds directly to step S318, i.e., the process directly controls to exit the battery pack heating and heat preservation function, and then controls the vehicle to enter the sleep state.

Figure 4:
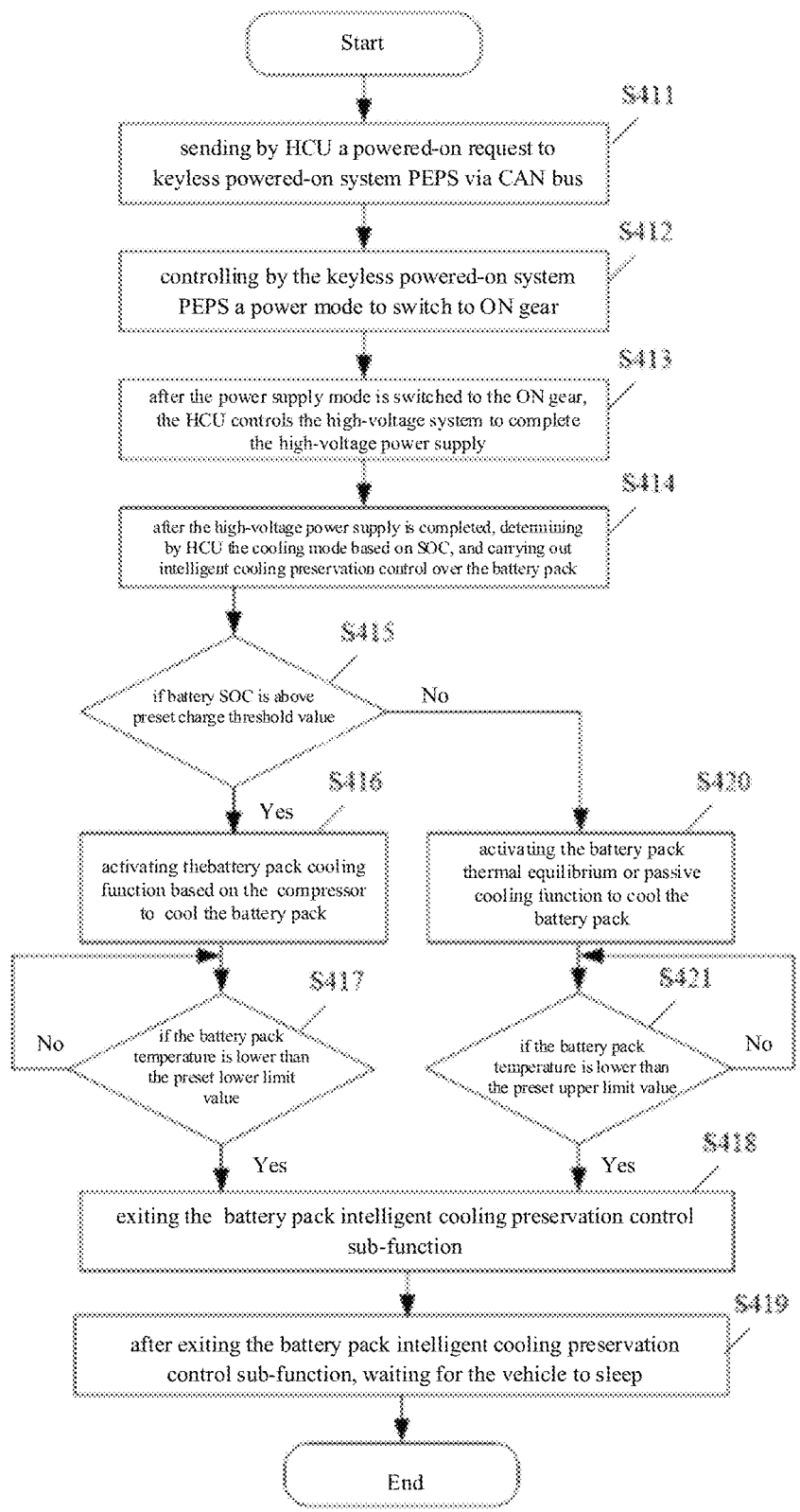
FIG. 4 is a flowchart for executing step S204 in another embodiment of the present disclosure.

Reference is made to FIG. 4, which shows a flow chart of the execution of the above-mentioned step S204 of an embodiment of the present disclosure in practical application, including steps S411-S421. As shown in FIG. 4, in step S411, when the vehicle is in the powered-on state, and the current battery temperature value is less than the preset lower limit value, the hybrid control unit first transmits a powered-on request to a keyless powered-on system through a controller area network bus, and then in step S412, the keyless powered-on system controls the power mode of the vehicle to switch to ON gear. In step S413, after the power supply mode is switched to the ON gear, the hybrid control unit controls the high-voltage system to complete the high-voltage power supply. In step S414, after the high-voltage system completes the high-voltage power supply, the hybrid control unit controls the cooling module to execute the cooling for the battery pack on the basis of the state of charge value of the battery pack:

in step S415, it is determined whether the battery pack SOC is greater than a charge threshold value; when the state of charge value of the battery pack is greater than the preset charge threshold value, the process proceeds to step S416, controlling the battery pack to supply power to the compressor so as to use the compressor to cool the battery pack until the current temperature value of the battery pack is less than or equal to the preset upper limit value, and then the process proceeds to step S418, i.e., controlling the compressor to stop working so as to control to exit the battery pack cooling preservation function. Then the process proceeds to step 419, i.e., after the battery pack cooling preservation function has been exited, controlling the vehicle to enter a sleep state;

When the state of charge value of the battery pack is less than or equal to the preset charge threshold value, the process proceeds to step S420, cooling the battery pack via the cooling water circulation structure in the battery pack or the radiator of the vehicle until the current temperature value of the battery pack is less than or equal to the preset upper limit value, and then controlling the cooling water circulation structure or the radiator to stop operating so as to control to exit the battery pack cooling preservation function. After the battery pack cooling preservation function is exited, the vehicle is controlled to enter a sleep state.

In a preferred embodiment provided by the present disclosure, the above-mentioned battery pack control method includes steps S501 to S506:

step S501, acquiring a current battery temperature value of a battery pack of the vehicle and a current state of a thermostatic control function of the battery pack via the battery sensor when the vehicle is in a powered-off state.

The above-mentioned step S501 can be described in detail with reference to step S201, and will not be described again here.

Step S502, switching the vehicle from a powered-off state to a powered-on state when the current battery temperature value is not within a preset range and the current state of the thermostatic control function is ON-state.

The above-mentioned step S502 can be described in detail with reference to step S202, and will not be described again here.

S503, acquiring a current ambient temperature value when the vehicle is in the powered-on state;

Since the temperature of the battery pack is likely to be temporarily lower than the preset lower limit value when, for example, the vehicle has just stopped entering into the higher temperature environment from the lower temperature environment, but if the current ambient temperature value is greater than the preset lower limit value, even if the battery pack is not heated, the temperature of the battery pack is gradually increased to be consistent with the current ambient temperature value under the action of the ambient temperature, that is, the temperature of the battery pack is increased to be greater than or equal to the preset lower limit value;

If the vehicle has just stopped entering into the lower temperature environment from the higher temperature environment, the temperature of the battery pack is likely to be temporarily lower than the preset lower limit value, but if the current ambient temperature value is lower than the preset upper limit value, even if the battery pack is not cooled, the temperature of the battery pack will gradually decrease to match the current ambient temperature value under the effect of the ambient temperature, i.e., the temperature of the battery pack will decrease to less than or equal to the preset lower limit value.

Therefore, in the above step S503, when the vehicle is in a powered-on state, it needs that the current ambient temperature is monitored by the temperature sensor of the vehicle to obtain a current ambient temperature value so as to accurately determine whether the heating process or the cooling of the battery pack is required.

Step S504, performing a heating process on the battery pack by the heating module, if the heating module satisfies a first preset condition so that the temperature of the battery pack returns to be within the preset range, when the vehicle is in the powered-on state and the current battery temperature value is less than the preset lower limit value, wherein preset lower limit value is the minimum value within the preset range;

the first preset condition includes that the heating module is enabled, and after the vehicle is in a powered-off state, the number of times the heating module is enabled is less than a first number threshold value, and the current ambient temperature value is less than a preset temperature threshold value.

In the above-mentioned step S504, i.e., when the current battery temperature value is less than the preset lower limit value when the vehicle is in the powered-on state, the heating module still needs to be enabled, and after the vehicle stops and enters into the powered-off state until the current number of times of starting is less than the first number threshold value, and the current ambient temperature value is less than the preset temperature threshold value, the heating module will heat the battery pack so as to return the temperature of the battery pack to within the preset range. That is, when any one of the conditions that the heating module is enabled and after the vehicle stops and enters into the powered-off state until the current number of times of starting the heating module is less than the first threshold value and the current ambient temperature value is less than the preset temperature threshold value is not satisfied, the heating module will not heat the battery pack.

Wherein the above-mentioned preset temperature threshold value should be greater than or equal to the above-mentioned preset lower limit value, and can be specifically set as the above-mentioned preset lower limit value, i.e., the minimum value within the preset range. In practical application, the above-mentioned preset temperature threshold value can also be set via a preset interface, and the preset interface can present a setting option of the preset temperature threshold value. The preset interface can be displayed on a display screen of the vehicle central control or on a mobile terminal communicatively connected to the vehicle central control.

Step S505, if the number of times the first condition occurs is greater than or equal to a third number threshold value, controlling the battery sensor to enter a sleep state; wherein the first case is a case where the current battery temperature value is less than the preset lower limit value and the current ambient temperature value is not less than the preset temperature threshold value.

Since the battery sensor periodically detects a current temperature value of the battery pack, and if it is detected that the current battery temperature value of the battery pack is less than a preset lower limit value in one cycle, the vehicle is switched from a powered-off state to a powered-on state, and a current ambient temperature value of an environment in which the vehicle is located is detected, and if the current ambient temperature value is greater than or equal to a preset temperature threshold value, the first situation occurs once; if it is detected in the next cycle that the current battery temperature value of the battery pack is less than the preset lower limit value, the vehicle is still switched from the powered-off state to the powered-on state, and the current ambient temperature value of the environment in which the vehicle is located is detected; and if the current ambient temperature value is still greater than or equal to the preset temperature threshold value, the number of occurrences of the first condition is counted to be increased once.

If the number of occurrences of the first condition reaches the third number threshold value, it is indicated that the current ambient temperature value is continuously maintained in a state greater than or equal to the preset temperature threshold value, the battery pack is only temporarily in a lower temperature state, and under the action of the ambient temperature, the temperature of the battery pack gradually increases to be consistent with the current ambient temperature value, i.e., the temperature of the battery pack increases to be greater than or equal to the preset lower limit value. Thus, there is no need to temporarily heat the battery pack, and there is no need to monitor the current temperature of the battery pack through the battery sensor, so that the battery sensor is controlled to enter a sleep state, that is, the vehicle is no longer awakened through the battery sensor, so as to save the power of the battery pack.

Step S506, performing a cooling process on the battery pack by the cooling module if the cooling module satisfies a second preset condition so that the temperature of the battery pack returns to be within the preset range, when the vehicle is in the powered-on state and the current battery temperature value is greater than the preset upper limit value, wherein preset upper limit value is the maximum value within the preset range; the second preset condition includes that the cooling module is enabled, and the number of times the cooling module is enabled after the vehicle is in a powered-off state is less than a second number threshold value.

The above-mentioned step S506 can be described in detail with reference to step S204, and will not be described again here.

The battery pack control method according to an embodiment of the present disclosure has the following advantages over the prior art:

When the vehicle is in a powered-off state, firstly, a battery sensor is used to detect a current battery temperature value of the battery pack and a current state of the thermostatic control function of the battery pack, and the vehicle is waken up when the current temperature value of the battery pack exceeds the preset range and the thermostatic control function of the battery pack is activated; and when the current battery temperature value is less than a preset lower limit value, the heating module is enabled and the current ambient temperature value is less than the preset temperature threshold value, and after the vehicle is in a powered-off state, the number of times the heating module is enabled is less than the first number threshold value, the battery pack is heated by the heating module so that the temperature of the battery pack returns to be within the preset range; and when the current battery temperature value is greater than the preset upper limit value, the cooling module is enabled, and after the vehicle is in a powered-off state, the number of times the cooling module is enabled is less than the second number threshold value, the battery pack is cooled by the cooling module so that the temperature of the battery pack returns to the preset range. The embodiments of the present disclosure not only solve the problems in the prior art that the temperature of the battery pack cannot be controlled using a heat management system after the vehicle is in a powered-off state, and the temperature of the battery pack is easily too low or too high due to a low or high ambient temperature, but also avoid the case where the battery pack is thermostatically controlled by a heating module or a cooling module when the thermostatically controlled battery pack is not needed, thereby avoiding the waste of power of the battery pack.

Figure 5:
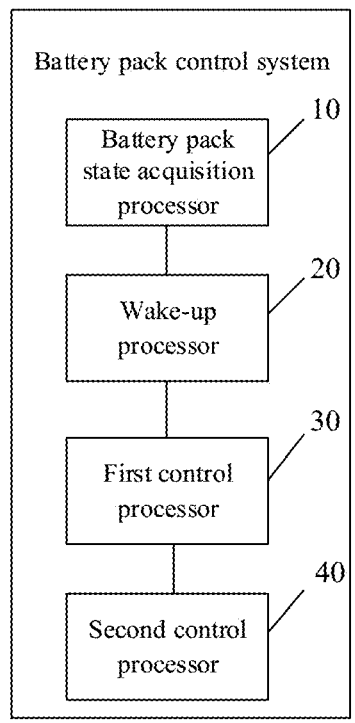
FIG. 5 is a schematic structure diagram of a battery pack control system according to an embodiment of the present disclosure.

Another objective of the present disclosure is to provide a battery pack control system applied to a vehicle including a battery sensor, wherein reference is made to FIG. 5 showing a schematic structural diagram of a battery pack control system according to an embodiment of the present disclosure, the system includes:

a battery pack state acquisition processor 10 configured to acquire a current battery temperature value of a battery pack of the vehicle and a current state of a thermostatic control function of the battery pack via the battery sensor when the vehicle is in a powered-off state;

a wake-up processor 20 configured to switch the vehicle from a powered-off state to a powered-on state when the current battery temperature value is not within a preset range and the current state of the thermostatic control function is ON-state;

a first control processor 30 configured to heat the battery pack by the heating module if the heating module satisfies a first preset condition so that the temperature of the battery pack returns to be within the preset range, when the vehicle is in the powered-on state and the current battery temperature value is less than the preset lower limit value, wherein preset lower limit value is the minimum value within the preset range; and a second control processor 40 configured to cool, the battery pack by the cooling module if the cooling module satisfies a second preset condition so that the temperature of the battery pack returns to be within the preset range, when the vehicle is in the powered-on state and the current battery temperature value is greater than the preset upper limit value, wherein preset upper limit value is the maximum value within the preset range.

In the system according to the embodiment of the present disclosure, the battery pack state acquiring processor 10 is first used, when the vehicle is in a powered-off state, a battery sensor is used to acquire a current temperature value of a battery pack of the vehicle and a current state of a thermostatic control function of the battery pack, and in the case where the current battery temperature value is not within a preset range and the current state of the thermostatic control function is ON-state, the vehicle is switched from the powered-off state to the powered-on state by an awaking processor 20; then in the case where the current battery temperature value is less than a preset lower limit value, if the heating module satisfies a first preset condition, the heating module is controlled to heat the battery pack via a first control processor 30 so as to enable the temperature of the battery pack to return to a preset range; or in the case where the current battery temperature value is greater than the preset upper limit value, if the cooling module satisfies the second preset condition, the cooling module is controlled by a second control processor 40 to cool the battery pack so that the temperature of the battery pack returns to be within the preset range. That is, in the present disclosure, when the vehicle is in a powered-off state, a battery sensor is firstly used to detect the current battery temperature value of the battery pack and the current state of the thermostatic control function of the battery pack; and when the current temperature value of the battery pack is out of a preset range and the thermostatic control function of the battery pack is activated, the vehicle is waken up, and then the battery pack is thermostatic controlled, so that the temperature of the battery pack is maintained within the preset range, which facilitates the restarting and use of the vehicle.

Optionally, according to the system, the first preset condition includes that the heating module is enabled, and after the vehicle is in the powered-off state, a number of times the heating module is enabled is less than a first number threshold value; and the second preset condition includes that the cooling module is enabled, and after the vehicle is in the powered-off state, a number of times the cooling module is enabled is less than a second number threshold value.

Optionally, the system further includes: an ambient temperature acquisition module configured to acquire a current ambient temperature value when the vehicle is in the powered-on state;

the first preset condition further includes that the current ambient temperature value is less than a preset temperature threshold value.

Optionally, the system further includes:

a third control processor configured to control the battery sensor to enter a sleep state if the heating module does not satisfy the first preset condition, or the cooling module does not satisfy the second preset condition, or the current state of the thermostatic control function of the battery pack is a cut-off state.

Optionally, the system further includes:

a fourth control processor for controlling the battery sensor to enter a sleep state, if the number of times a first case occurs is greater than or equal to a third number threshold value;

wherein the first case is a case when the current battery temperature value is less than the preset lower limit value and the current ambient temperature value is not less than the preset temperature threshold value.

Optionally, according to the system, the first preset condition further includes that a state of charge value of the battery pack is less than a preset charge threshold value, the heating module is an engine of the vehicle, the engine can be started, and the engine is used for heating the battery pack;

the heating includes:

starting the engine and heating the battery pack by the engine.

Optionally, according to the system, the first preset condition further includes that when the state of charge value of the battery pack is greater than or equal to a preset charge threshold value, the heating module is a heating element;

the heating includes:

utilizing the battery pack to supply power for a heating element and heating the battery pack by the heating element.

Optionally, according to the system, the second preset condition further includes that when the state of charge value of the battery pack is greater than or equal to a preset charge threshold value, the cooling module includes a compressor;

the cooling includes:

utilizing the battery pack to supply power for the compressor and cooling the battery pack by the compressor;

the second preset condition further includes that when the state of charge value of the battery pack is less than the preset charge threshold value, the cooling module includes a cooling water circulation structure in the battery pack or a radiator of the vehicle;

when the cooling module includes a cooling water circulation structure in the battery pack, the cooling includes:

cooling the battery pack by a cooling water circulation structure in the battery pack;

when the cooling module includes a radiator of the vehicle, the cooling includes:

utilizing the radiator to cool the battery pack.

It is still another objective of the present disclosure to provide a vehicle, wherein the vehicle includes the battery pack control system described above.

The advantages of the vehicle are the same as the above battery pack control method and system with respect to the prior art, and which will not be repeated here.

The technical details and advantages of the above-described system and vehicle have been described in detail in the above-described method, and will not be described in detail here.

In summary, the present disclosure provides a battery pack control method, a system and a vehicle. When the vehicle is in a powered-off state, firstly, the battery sensor is used to acquire the current temperature value of the battery pack of the vehicle and the current state of the thermostatic control function of the battery pack, and in the case where the current battery temperature value is not within a preset range and the current state of the thermostatic control function is ON-state, the vehicle is switched from the powered-off state to the powered-on state; then in the case where the current battery temperature value is less than the preset lower limit value, if the heating module satisfies a first preset condition, the battery pack is heated via the heating module so as to enable the temperature of the battery pack to return to a preset range; or in the case where the current battery temperature value is greater than the preset upper limit value, if the cooling module satisfies the second preset condition, the battery pack is cooled by the cooling module so that the temperature of the battery pack returns to be within the preset range. That is, in the present disclosure, when the vehicle is in a powered-off state, the battery sensor is firstly used to detect the current battery temperature value of the battery pack and the current state of the thermostatic control function of the battery pack; and when the current temperature value of the battery pack is out of a preset range and the thermostatic control function of the battery pack is activated, the vehicle is waken up, and then the battery pack is thermostatic controlled, so that the temperature of the battery pack is maintained within the preset range, which facilitates the restarting and use of the vehicle.

It will be clear to a person skilled in the art that, for the convenience and brevity of the description, specific working procedures of the above described systems, devices and units may be referred to corresponding procedures in the preceding method embodiments and will not be described in detail here.

The above description is meant to be illustrative of the preferred embodiments of the present disclosure and not to be construed as limiting the present disclosure, and any modifications, equivalents, improvements, etc. that fall within the spirit and scope of the present disclosure are intended to be included therein.

The above description is only for the specific embodiments of the present disclosure, but the scope of the present disclosure is not limited thereto, and any person skilled in the art can easily think of the changes or substitutions within the technical scope of the present disclosure, and shall cover the scope of the present disclosure. Therefore, the protection scope of the present disclosure shall be subject to the protection scope of the claims.

The above-described embodiments of the apparatus are merely illustrative, and the units described as separate parts may or may not be physically separate, and parts displayed as units may or may not be physical units, may be located in one position, or may be distributed on multiple network units. Some or all of the modules may be selected according to actual needs to achieve the purpose of the solution of this embodiment. A person skilled in the art can understand and implement it without inventive effort.

Various component embodiments of the present disclosure may be implemented in hardware, or in software modules running on one or more processors, or in a combination thereof. A person skilled in the art will appreciate that a microprocessor or digital signal processor (DSP) may be used In practical application to implement some or all of the functions of some or all of the components of a computing processing device in accordance with embodiments of the present disclosure. The present disclosure may also be embodied as apparatus or device programs (e.g., computer programs and computer program products) for carrying out a portion or all of the methods described herein. Such a program implementing the present disclosure may be stored on a computer-readable medium or may be in the form of one or more signals. Such signals may be downloaded from an Internet website, provided on a carrier signal, or provided in any other form.

Figure 6:
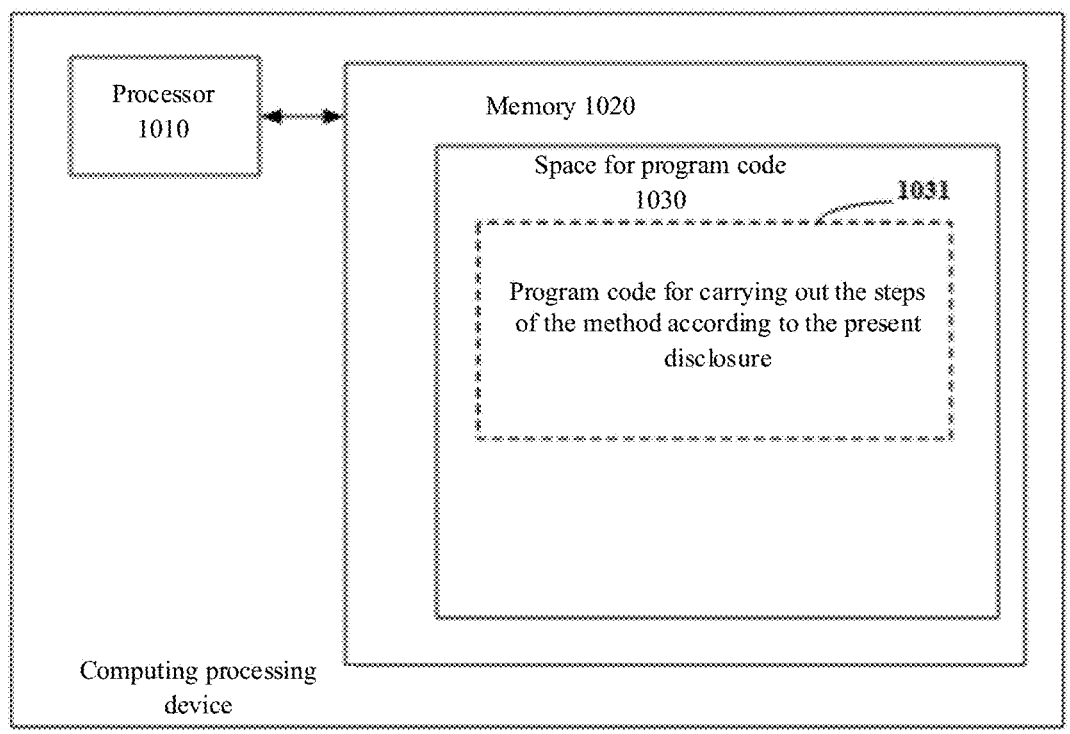
FIG. 6 schematically shows a block diagram of a computing processing device for executing a method according to the present disclosure.
Figure 7:
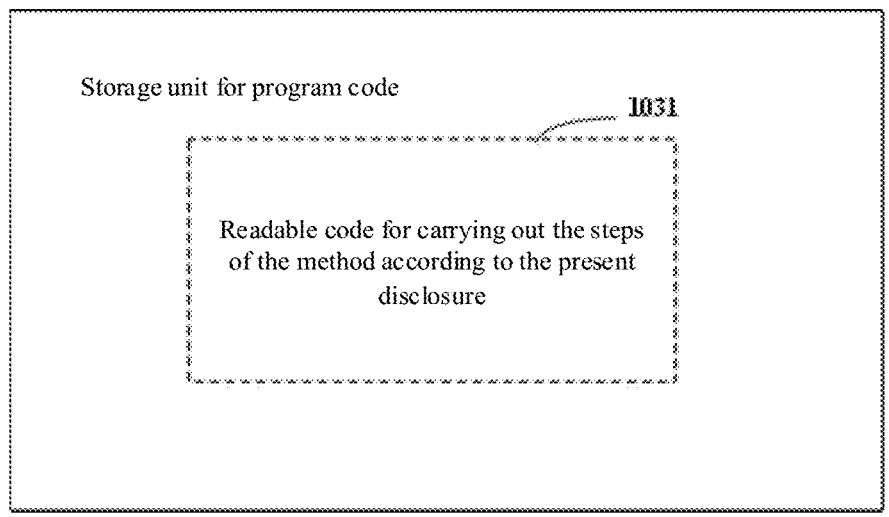
FIG. 7 schematically shows a memory unit for reserving or carrying program code implementing the method according to the present disclosure.

For example, FIG. 6 illustrates a computing processing device that may implement a method in accordance with the present disclosure. The computing processing device conventionally includes a processor 1010 and a computer program product or computer readable medium in the form of a memory 1020. The memory 1020 may be electronic memory such as flash memory, EEPROM (electrically erasable programmable read only memory), EPROM, hard disk, or ROM. The memory 1020 has a storage space 1030 for program code 1031 for carrying out any of the above-mentioned method steps. For example, the storage space 1030 for program code may include respective program code 1031 for implementing various steps in the above method, respectively. The program code may be read from or written to one or more computer program products. These computer program products include a program code carrier such as a hard disk, a compact disc (CD), a memory card or a floppy disk. Such a computer program product is typically a portable or fixed storage unit as described with reference to FIG. 7. The memory unit may have memory segments, memory space, etc. arranged similarly to memory 1020 in the computing processing device of FIG. 6. The program code may, for example, be compressed in a suitable form. Generally, the memory unit includes computer readable code 1031', i.e., code that can be read by a processor, such as, for example, 1010, which when executed by a computing processing device, causes the computing processing device to carry out the various steps according to the methods described above.

Reference herein to "one embodiment", "an embodiment", or "one or more embodiments" means that a particular feature, structure, or characteristic described in connection with the embodiment is included in at least one embodiment of the present disclosure. In addition, it is noted that instances of the word "in one embodiment" herein are not necessarily all referring to the same embodiment.

In the description provided herein, numerous specific details are set forth. However, it is understood that embodiments of the present disclosure may be practiced without these specific details. In some instances, well-known methods, structures and techniques have not been shown in detail in order not to obscure the understanding of this description.

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The present disclosure can be implemented by means of hardware comprising several distinct elements, and by means of a suitably programmed computer. In the unit claims enumerating several means, several of these means can be embodied by one and the same item of hardware. The use of the words first, second, third, etc. does not denote any order. These words may be interpreted as names.

Finally, it should be noted that: the above examples are only intended to illustrate the technical solution of the present disclosure, not to limit it; although the present disclosure has been described in detail with reference to the foregoing embodiments, it should be understood by a person skilled in the art that: the technical solutions described in the foregoing embodiments may still be modified, or some technical features may be equivalently replaced; such modifications and substitutions do not depart from the spirit and scope of the technical solutions of the embodiments of the present disclosure.

The invention claimed is:

1. A battery pack control method, which is applied to a vehicle, wherein the vehicle comprises a battery sensor, a heating module, and a cooling module, the method comprises:

by using a battery pack state acquisition processor, acquiring a current battery temperature value of a battery pack of the vehicle and a current state of a thermostatic control function of the battery pack via the battery sensor when the vehicle is in a powered-off state;

by using a wake-up processor, switching the vehicle from a powered-off state to a powered-on state when the current battery temperature value is not within a preset range and the current state of the thermostatic control function is ON-state;

by using a first control processor, performing a heating process on the battery pack by the heating module so that the temperature of the battery pack returns to be within the preset range, when the vehicle is in the powered-on state, the current battery temperature value is less than a preset lower limit value and the heating module satisfies a first preset condition, wherein the preset lower limit value is a minimum value within the preset range, the first preset condition comprises that the heating module is enabled, and after the vehicle is in the powered-off state, a number of times that the heating module is enabled is less than a first number threshold value;

by using a second control processor, performing a cooling process on the battery pack by the cooling module, so that the temperature of the battery pack returns to be within the preset range, when the vehicle is in the powered-on state, the current battery temperature value is greater than a preset upper limit value and the cooling module satisfies a second preset condition, wherein the preset upper limit value is a maximum value within the preset range, the second preset condition comprises that the cooling module is enabled, and after the vehicle is in the powered-off state, a number of times that the cooling module is enabled is less than a second number threshold value; and by using a third control processor, controlling the battery sensor to enter a sleep state when the heating module does not satisfy the first preset condition, or the cooling module does not satisfy the second preset condition.

2. The method according to claim 1, wherein before the step that by using the first control processor, performing the heating process on the battery pack by the heating module when the heating module satisfies the first preset condition, so that the temperature of the battery pack returns to be within the preset range, when the vehicle is in the powered-on state and the current temperature value is less than the preset lower limit value, the method further comprises:

acquiring a current ambient temperature value when the vehicle is in the powered-on state; and the first preset condition further comprises that the current ambient temperature value is less than a preset temperature threshold value.

3. The method according to claim 2, wherein the method further comprises:

by using a fourth control processor, controlling the battery sensor to enter a sleep state, when a number of times a first case occurs is greater than or equal to a third number threshold value;

wherein the first case is a case where the current battery temperature value is less than the preset lower limit value and the current ambient temperature value is not less than the preset temperature threshold value.

4. The method according to claim 1, wherein the method further comprises:

by using the third control processor, controlling the battery sensor to enter the sleep state when the current state of the thermostatic control function of the battery pack is a cut-off state.

5. The method according to claim 1, wherein the first preset condition further comprises that a state of charge value of the battery pack is less than a preset charge threshold value, the heating module is an engine of the vehicle, the engine is capable of being started, and the engine is used for performing a heating process on the battery pack;

the heating process comprises:
starting the engine and heating the battery pack by the engine.

6. The method according to claim 1, wherein the first preset condition further comprises that when the state of charge value of the battery pack is greater than or equal to a preset charge threshold value, the heating module is a heating element;

the heating process comprises:
utilizing the battery pack to supply power for a heating element and heating the battery pack by the heating element.

7. The method according to claim 1, wherein the second preset condition further comprises that when the state of charge value of the battery pack is greater than or equal to a preset charge threshold value, the cooling module comprises a compressor;

the cooling process comprises:
utilizing the battery pack to supply power for the compressor and cooling the battery pack by the compressor;

the second preset condition further comprises that when the state of charge value of the battery pack is less than the preset charge threshold value, the cooling module comprises a cooling water circulation structure in the battery pack or a radiator of the vehicle;

when the cooling module comprises the cooling water circulation structure in the battery pack, the cooling process comprises:
cooling the battery pack by the cooling water circulation structure in the battery pack;

when the cooling module comprises a radiator of the vehicle, the cooling comprises:
utilizing the radiator to cool the battery pack.

8. A computing processing device, wherein the computing processing device comprises:

a memory in which a computer readable code is stored; and wherein when the computer readable code is executed by the computing processing device, the computing processing device performs the battery pack control method according to claim 1.

9. A non-transitory computer-readable medium having computer readable code stored thereon which, when executed by a processor, the computer-readable code causes the processor to execute the battery pack control method according to claim 1.

10. A battery pack control system, which is applied to a vehicle, wherein the vehicle comprises a battery sensor, a heating module and a cooling module, the system comprises:

a battery pack state acquisition processor configured to acquire a current battery temperature value of a battery pack of the vehicle and a current state of a thermostatic control function of the battery pack via the battery sensor when the vehicle is in a powered-off state;

a wake-up processor configured to switch the vehicle from a powered-off state to a powered-on state when the current battery temperature value is not within a preset range and the current state of the thermostatic control function is an ON-state;

a first control processor configured to perform a heating process on the battery pack by the heating module, so that the temperature of the battery pack returns to be within the preset range, when the vehicle is in the powered-on state, the current battery temperature value is less than a preset lower limit value and the heating module satisfies a first preset condition, wherein the preset lower limit value is a minimum value within the preset range, the first preset condition comprises that the heating module is enabled, and after the vehicle is in the powered-off state, a number of times that the heating module is enabled is less than a first number threshold value;

a second control processor configured to perform a cooling process on the battery pack by the cooling module so that the temperature of the battery pack returns to be within the preset range, when the vehicle is in the powered-on state, the current battery temperature value is greater than a preset upper limit value and the cooling module satisfies a second preset condition, wherein the preset upper limit value is a maximum value within the preset range, the second preset condition comprises that the cooling module is enabled, and after the vehicle is in the powered-off state, a number of times that the cooling module is enabled is less than a second number threshold value; and a third control processor configured to control the battery sensor to enter a sleep state when the heating module does not satisfy the first preset condition, or the cooling module does not satisfy the second preset condition.

11. A vehicle, wherein the vehicle comprises the battery pack control system according to claim 10.

* * * * *